United States Patent
Ovesjö et al.

(10) Patent No.: US 11,063,734 B2
(45) Date of Patent: Jul. 13, 2021

(54) CONFIGURATION OF PERIODIC SIGNALS IN A TIME DIVISION DUPLEX COMMUNICATION SYSTEM

(71) Applicant: Telefonaktiebolaget LM Ericsson (publ), Stockholm (SE)

(72) Inventors: Fredrik Ovesjö, Älvsjö (SE); Robert Baldemair, Solna (SE); Sorour Falahati, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/756,647

(22) PCT Filed: Jan. 11, 2019

(86) PCT No.: PCT/SE2019/050014
§ 371 (c)(1),
(2) Date: Apr. 16, 2020

(87) PCT Pub. No.: WO2019/139534
PCT Pub. Date: Jun. 18, 2019

(65) Prior Publication Data
US 2020/0259629 A1    Aug. 13, 2020

Related U.S. Application Data

(60) Provisional application No. 62/616,793, filed on Jan. 12, 2018.

(51) Int. Cl.
*H04L 5/14* (2006.01)
(52) U.S. Cl.
CPC .................................. *H04L 5/1438* (2013.01)

(58) Field of Classification Search
None
See application file for complete search history.

(56) References Cited

U.S. PATENT DOCUMENTS

| | | | | |
|---|---|---|---|---|
| 2013/0083683 A1* | 4/2013 | Hwang | ................. | H04L 5/0053 370/252 |
| 2013/0279343 A1* | 10/2013 | Jeong | .................... | H04W 24/02 370/241 |
| 2014/0050107 A1* | 2/2014 | Charbit | ............. | H04W 72/1289 370/252 |

(Continued)

FOREIGN PATENT DOCUMENTS

WO    2017097640 A1    6/2017

OTHER PUBLICATIONS

PCT International Search Report and Written Opinion, dated Jul. 18, 2019, for International Application No. PCT/SE2019/050014, 9 pages.

*Primary Examiner* — Jamaal Henson
(74) *Attorney, Agent, or Firm* — Sage Patent Group

(57) ABSTRACT

Apparatuses and methods are disclosed for configuring periodic signals in time division duplex (TDD). In one embodiment, a method for a network node includes configuring at least one periodic signal of the WD based at least on at least one parameter, the at least one parameter corresponding to a TDD pattern. In another embodiment, a method for a WD includes communicating at least one periodic signal to the network node based at least on at least one parameter, the at least one parameter corresponding to a TDD pattern.

17 Claims, 8 Drawing Sheets

(56) References Cited

U.S. PATENT DOCUMENTS

| | | | |
|---|---|---|---|
| 2014/0307595 A1* | 10/2014 | Chen .................... | H04L 5/0028 |
| | | | 370/280 |
| 2014/0334355 A1 | 11/2014 | Ekpenyong et al. | |
| 2016/0286555 A1* | 9/2016 | Papasakellariou .... | H04L 5/0053 |
| 2017/0302419 A1* | 10/2017 | Liu ....................... | H04L 5/0082 |

* cited by examiner

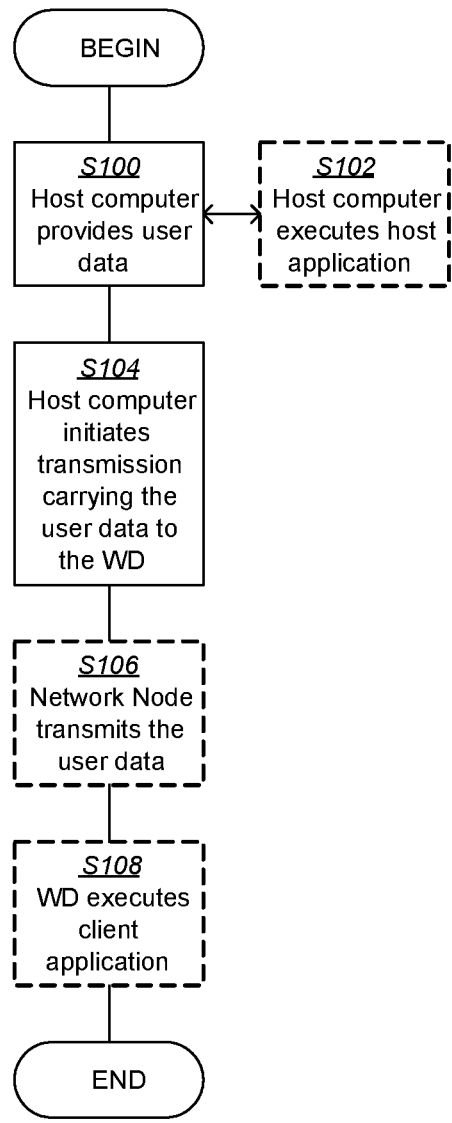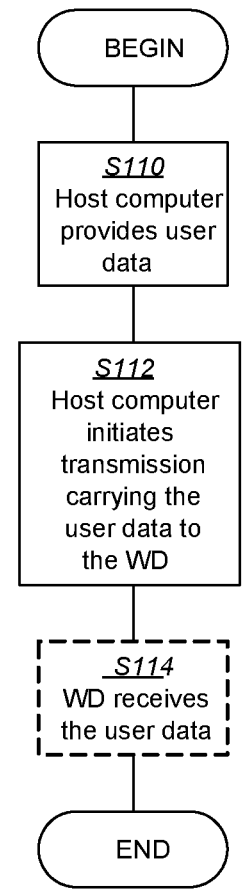
FIG. 7
FIG. 8

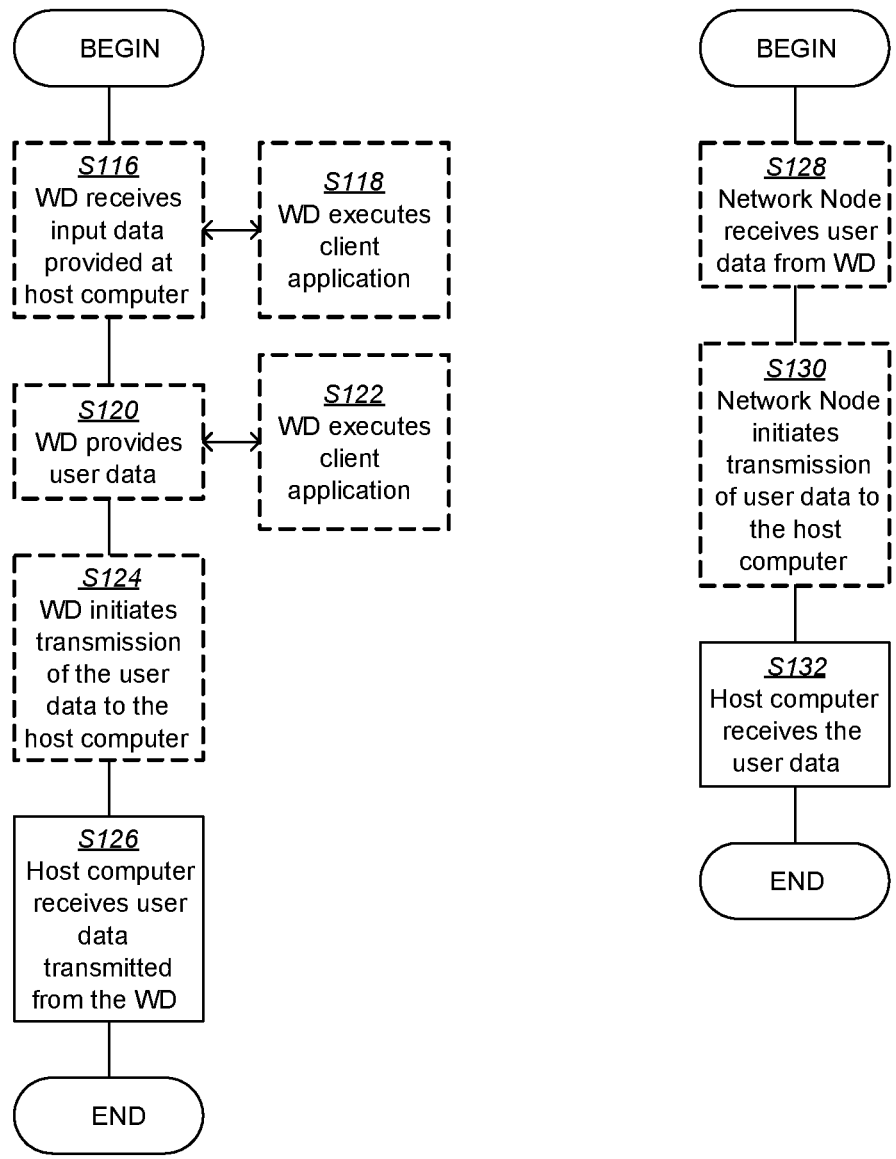

CONFIGURATION OF PERIODIC SIGNALS IN A TIME DIVISION DUPLEX COMMUNICATION SYSTEM

CROSS-REFERENCE TO RELATED APPLICATIONS

This application is a 35 U.S.C § 371 national stage application for International Application No. PCT/SE2019/050014, entitled "CONFIGURATION OF PERIODIC SIGNALS IN A TIME DIVISION DUPLEX COMMUNICATION SYSTEM", filed on Jan. 11, 2019, which claims priority to U.S. Provisional Patent Application No. 62/616,793, filed on Jan. 12, 2018, the disclosures and contents of which are hereby incorporated by reference in their entireties.

TECHNICAL FIELD

Wireless communication and in particular, to methods and apparatuses for the configuration of periodic signals in a time division duplex (TDD) system.

BACKGROUND

For a number of signals, it has been proposed that periodicities be expressed as multiples of symbols or slots. For example, periodicities for a Scheduling Request (SR) are provided in New Radio (NR) Technical Specification (TS) 38.213 section 9.2.4, as follows:

TABLE 9.2.4

User Equipment (UE)-specific SR periodicity and offset configuration
UE-specific SR periodicity and offset configuration (in symbols)

| μ | CP | | |
|---|---|---|---|
| 0 | Normal | $SR_{PERIODICITY}$ | 2, 7, n*14, where n = {1, 2, 5, 10, 20, 32, 40, 64, 80} |
| | | $SR_{OFFSET}$ | |
| 1 | Normal | $SR_{PERIODICITY}$ | 2, 7, n*14, where n = {1, 2, 5, 10, 20, 32, 40, 64, 80, 160} |
| | | $SR_{OFFSET}$ | |
| 2 | Normal | $SR_{PERIODICITY}$ | 2, 7, n*14, where n = {1, 2, 5, 10, 20, 32, 40, 64, 80, 160, 320} |
| | | $SR_{OFFSET}$ | |
| 2 | Extended | $SR_{PERIODICITY}$ | 2, 6, n*12, where n = {1, 2, 5, 10, 20, 32, 40, 64, 80, 160, 320} |
| | | $SR_{OFFSET}$ | |
| 3 | Normal | $SR_{PERIODICITY}$ | 2, 7, n*14, where n = {1, 2, 5, 10, 20, 32, 40, 64, 80, 160, 320, 640} |
| | | $SR_{OFFSET}$ | |

As another example, TS 38.213 section 6.1.2.3 provides for periodicities for an Uplink transmission without grant, as follows:

TABLE 6.1.2.3-1

Allowed periodicities P for uplink transmission without grant.

| μ | CP | Possible values of periodicities P [symbols] |
|---|---|---|
| 0 | Normal | 2, 7, n*14, where n = {1, 2, 5, 10, 20, 32, 40, 64, 80, 128, 160, 320, 640} |
| 1 | Normal | 2, 7, n*14, where n = {1, 2, 4, 10, 20, 40, 64, 80, 128, 160, 256, 320, 640, 1280} |
| 2 | Normal | 2, 7, n*14, where n = {1, 2, 4, 8, 20, 40, 80, 128, 160, 256, 320, 512, 640, 1280, 2560} |
| 2 | Extended | 2, 6, n*12, where n = {1, 2, 4, 8, 20, 40, 80, 128, 160, 256, 320, 512, 640, 1280, 2560} |
| 3 | Normal | 2, 7, n*14, where n = {1, 2, 4, 8, 16, 40, 80, 160, 256, 320, 512, 640, 1024, 1280, 2560, 5120} |

TS 38.211 section 6.4.1.4.4 provides for periodicities for a Sounding Reference Signal (SRS), as follows:

TABLE 6.4.1.4.4-1

SRS time configuration.

| SRS Configuration Index $I_{SRS}$ | SRS Periodicity (slots) $T_{SRS}$ | SRS Slot Offset $T_{offset}$ |
|---|---|---|
| 0 | 1 | 0 |
| 1-2 | 2 | $I_{SRS} - 1$ |
| 3-7 | 5 | $I_{SRS} - 3$ |
| 8-17 | 10 | $I_{SRS} - 8$ |
| 18-37 | 20 | $I_{SRS} - 18$ |
| 38-77 | 40 | $I_{SRS} - 38$ |
| 78-157 | 80 | $I_{SRS} - 78$ |
| 158-317 | 160 | $I_{SRS} - 158$ |
| 318-637 | 320 | $I_{SRS} - 318$ |
| 638-1277 | 640 | $I_{SRS} - 638$ |
| 1278-2557 | 1280 | $I_{SRS} - 1278$ |
| 2558-5077 | 2560 | $I_{SRS} - 2558$ |
| 5078-8191 | Reserved | Reserved |

TS 38.211 section 7.4.1.5.2 provides for periodicities for Channel State Information Reference Signal (CSI-RS), as follows:

TABLE 7.4.1.5.2-6

Slots containing CSI-RS.

| CSI-RS-timeConfig i | Slot offset | Periodicity |
|---|---|---|
| 0-4 | i | 5 |
| 5-14 | i − 5 | 10 |
| 15-34 | i − 15 | 20 |
| 35-74 | i − 35 | 40 |
| 75-154 | i − 75 | 80 |
| 155-314 | i − 155 | 160 |
| 315-634 | i − 315 | 320 |
| 635-1274 | i − 635 | 640 |

As can be seen above, the SR and uplink transmission without grant periodicity are based on symbols to enable the cases where every second (2nd) and seventh (7th) symbol are considered a transmission opportunity.

New Radio (NR) may support both frequency division duplex (FDD) and TDD. With TDD, there may be a large degree of flexibility of the TDD patterns that can be configured. A TDD pattern may be considered to decide or determine which symbols in the pattern are used for uplink (UL), i.e., from the network node to the wireless device, and downlink (DL), i.e., from the wireless device to the network node, transmission and what symbols that are used as guard symbols between DL and UL transmissions. NR supports both dynamic TDD and (semi-)static TDD. In dynamic TDD, a UE has no long term TDD pattern. On the other hand, in (semi-)static TDD, a UE can be provided (e.g., semi-statically configured) with a TDD pattern. The TDD pattern typically has a certain duration in number of slots, and then the pattern repeats itself again. Examples of possible patterns are shown in FIG. 1. The patterns may be considered to repeat in time.

With the existing signaling, in order to configure SR, SRS, uplink transmission without grant (also called uplink transmissions with configured grant) and CSI-RS periodicities, certain TDD patterns will be difficult to use in practice, as the TDD pattern periodicity may not fit well with the periodicity of the transmission instances as indicated by Layer 3 (L3).

Consider, as an example, TDD pattern C example in FIG. 1 with two DL slots followed by one UL slot (i.e., the length of the pattern is three slots). Assuming a 15 kHz numerology, where each slot is 1 ms long, this results in an UL transmission opportunity every 3 ms. Looking, for example, at the SR periodicity for 15 kHz numerology ($\mu=1$), the SR periodicity may include 1, 2, 5, 10, 20, 32, 40, 64, 80 slots. Out of these, there may be no value that is a multiple of 3; in effect, rendering this length of TDD pattern as effectively precluded for SR in this example.

SUMMARY

Some embodiments advantageously provide methods, systems, and apparatuses for the configuration of periodic signals in a TDD system.

In some embodiments, a network node is provided that is configured to configure a periodic signal associated with a wireless device (WD) based at least on at least one parameter, the at least one parameter including a first parameter corresponding to a length of a TDD pattern.

In some embodiments, a wireless device (WD) is provided that is configured to communicate a periodic signal to the network node based at least on at least one parameter, the at least one parameter including a first parameter corresponding to a length of a time division duplex (TDD) pattern.

According to a first aspect of the present disclosure, a network node configured to communicate with a wireless device, WD, is provided. The network node is configured to configure at least one periodic signal of the WD based at least on at least one parameter, the at least one parameter corresponding to a time division duplex, TDD, pattern.

In some embodiments of this aspect, the at least one parameter includes a parameter corresponding to a length of the TDD pattern. In some embodiments of this aspect, the network node is further configured to configure the periodic signal of the WD by being configured to cause the radio interface to signal the at least one parameter corresponding to the TDD pattern to the WD. In some embodiments of this aspect, the at least one periodic signal includes at least one of a Scheduling Request, a Sounding Reference Signal, an Uplink transmission without grant and a Channel State Information—Reference Signal. In some embodiments of this aspect, the at least one parameter includes a parameter representing a periodicity as a multiple of a length of the TDD pattern. In some embodiments of this aspect, the at least one parameter includes a parameter corresponding to an offset associated with the TDD pattern. In some embodiments of this aspect, the at least one parameter includes an indication of transmission opportunities in the TDD pattern for the WD. In some embodiments of this aspect, the indication of the transmission opportunities for the WD is one of a bitmap and a variable-length vector that indicates the transmission opportunities. In some embodiments of this aspect, the at least one parameter includes a first parameter representing a periodicity in terms of transmission opportunities and a second parameter representing an offset in terms of transmission opportunities. In some embodiments of this aspect, the transmission opportunities are indicated using contiguous integers.

According to a second aspect of the present disclosure, a method for a network node configured to communicate with a wireless device, WD, is provided. The method comprises configuring at least one periodic signal of the WD based at least on at least one parameter, the at least one parameter corresponding to a time division duplex, TDD, pattern.

In some embodiments of this aspect, the at least one parameter includes a parameter corresponding to a length of the TDD pattern. In some embodiments of this aspect, the configuring the periodic signal of the WD based at least on the at least one parameter further comprises signaling the at least one parameter corresponding to the TDD pattern to the WD. In some embodiments of this aspect, the at least one periodic signal includes at least one of a Scheduling Request, a Sounding Reference Signal, an Uplink transmission without grant and a Channel State Information—Reference Signal. In some embodiments of this aspect, the at least one parameter includes a parameter representing a periodicity as a multiple of a length of the TDD pattern. In some embodiments of this aspect, the at least one parameter includes a parameter corresponding to an offset associated with the TDD pattern. In some embodiments of this aspect, the at least one parameter includes an indication of transmission opportunities in the TDD pattern for the WD. In some embodiments of this aspect, the indication of the transmission opportunities for the WD is one of a bitmap and a variable-length vector that indicates the transmission opportunities. In some embodiments of this aspect, the at least one parameter includes a first parameter representing a periodicity in terms of transmission opportunities and a second parameter representing an offset in terms of transmission opportunities. In some embodiments of this aspect, the transmission opportunities are indicated using contiguous integers.

According to a third aspect of the present disclosure, a wireless device, WD, configured to communicate with a network node is provided. The WD is configured to cause a radio interface to communicate at least one periodic signal to the network node based at least on at least one parameter, the at least one parameter corresponding to a time division duplex, TDD, pattern.

In some embodiments of this aspect, the at least one parameter includes a parameter corresponding to a length of the TDD pattern. In some embodiments of this aspect, the WD is further configured to cause the radio interface to receive signaling of the at least one parameter corresponding to the TDD pattern from the network node. In some embodiments of this aspect, the at least one periodic signal includes at least one of a Scheduling Request, a Sounding Reference Signal, an Uplink transmission without grant and a Channel State Information—Reference Signal. In some embodiments of this aspect, the at least one parameter includes a parameter representing a periodicity as a multiple of a length of the TDD pattern. In some embodiments of this aspect, the at least one parameter includes a parameter corresponding to an offset associated with the TDD pattern. In some embodiments of this aspect, the at least one parameter includes an indication of transmission opportunities in the TDD pattern for the WD. In some embodiments of this aspect, the indication of the transmission opportunities for the WD is one of a bitmap and a variable-length vector that indicates the transmission opportunities. In some embodiments of this aspect, the at least one parameter includes a first parameter representing a periodicity in terms of transmission opportunities and a second parameter representing an offset in terms of transmission opportunities. In some embodiments of this aspect, the transmission opportunities are indicated using contiguous integers.

According to a fourth aspect of the present disclosure, a method for a wireless device, WD, configured to communicate with a network node is provided. The method comprises communicating at least one periodic signal to the network node based at least on at least one parameter, the at least one parameter corresponding to a time division duplex, TDD, pattern.

In some embodiments of this aspect, the at least one parameter includes a parameter corresponding to a length of the TDD pattern. In some embodiments of this aspect, the method further includes receiving signaling of the at least one parameter corresponding to the TDD pattern from the network node. In some embodiments of this aspect, the at least one periodic signal includes at least one of a Scheduling Request, a Sounding Reference Signal, an Uplink transmission without grant and a Channel State Information—Reference Signal. In some embodiments of this aspect, the at least one parameter includes a parameter representing a periodicity as a multiple of a length of the TDD pattern. In some embodiments of this aspect, the at least one parameter includes a parameter corresponding to an offset associated with the TDD pattern. In some embodiments of this aspect, the at least one parameter includes an indication of transmission opportunities in the TDD pattern for the WD. In some embodiments of this aspect, the indication of the transmission opportunities for the WD is one of a bitmap and a variable-length vector that indicates the transmission opportunities. In some embodiments of this aspect, the at least one parameter includes a first parameter representing a periodicity in terms of transmission opportunities and a second parameter representing an offset in terms of transmission opportunities. In some embodiments of this aspect, the transmission opportunities are indicated using contiguous integers.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIGS. 7-10 are flowcharts illustrating exemplary methods implemented in a communication system including a host computer, a network node and a wireless device according to some embodiments of the present disclosure;

DETAILED DESCRIPTION

Figure 1:
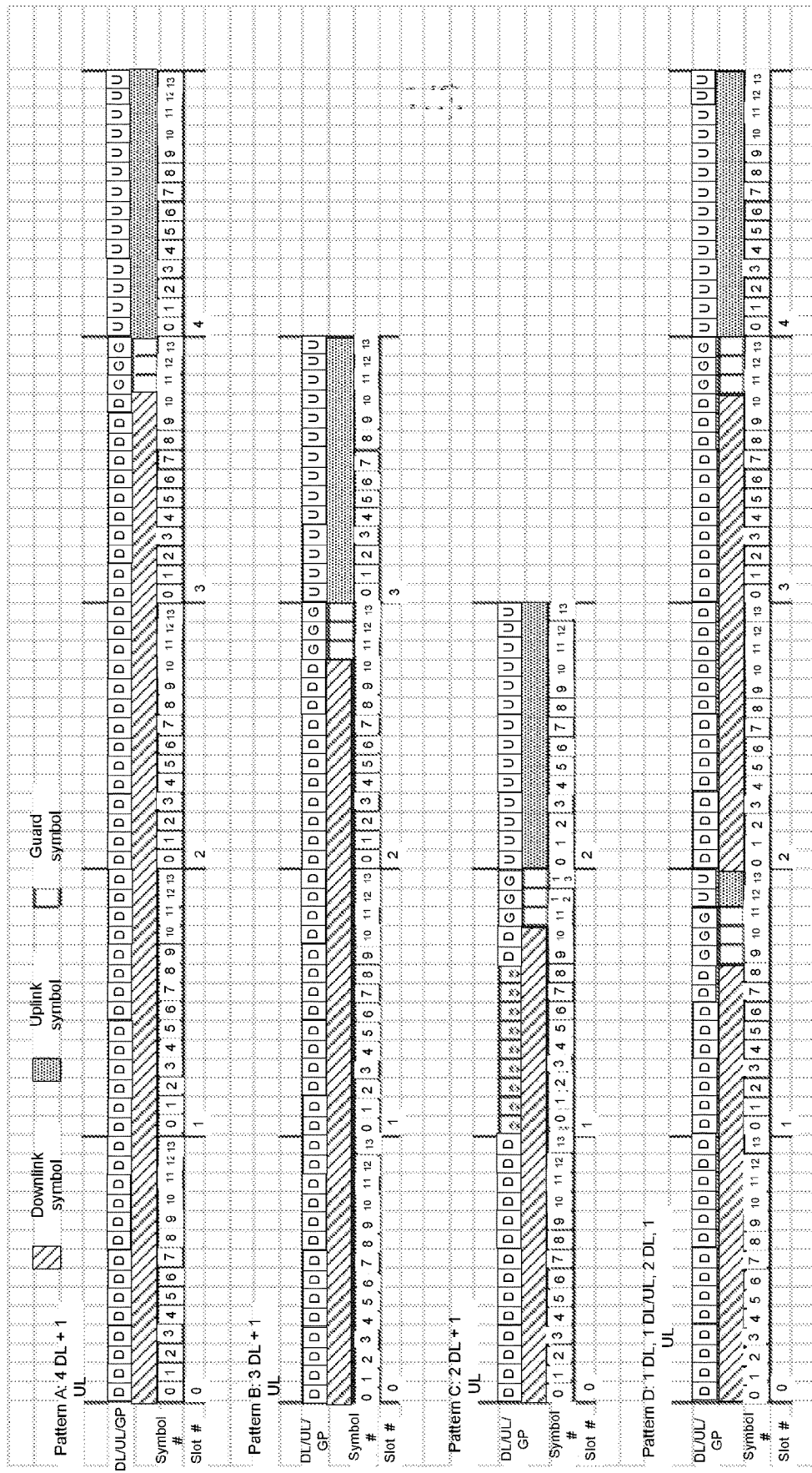
FIG. 1 is a schematic diagram illustrating examples of TDD patterns.

Before describing in detail exemplary embodiments, it is noted that the embodiments reside primarily in combinations of apparatus components and processing steps related to the configuration of periodic signals in a time division duplex (TDD) system. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU)

Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP NR or Long Term Evolution (LTE), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for the use of a signaling for configuration of periodicity that takes the TDD pattern periodicity into account, so that any TDD pattern duration can be supported. Embodiments also provide a flexible way of configuring periodic signals for a TDD pattern. Since a wide range of TDD patterns and TDD pattern durations can be provided by some embodiments, such signaling may ensure that lack of flexibility in the L3 signaling of periodicities for certain signals do no restrict the TDD pattern design.

Figure 2:
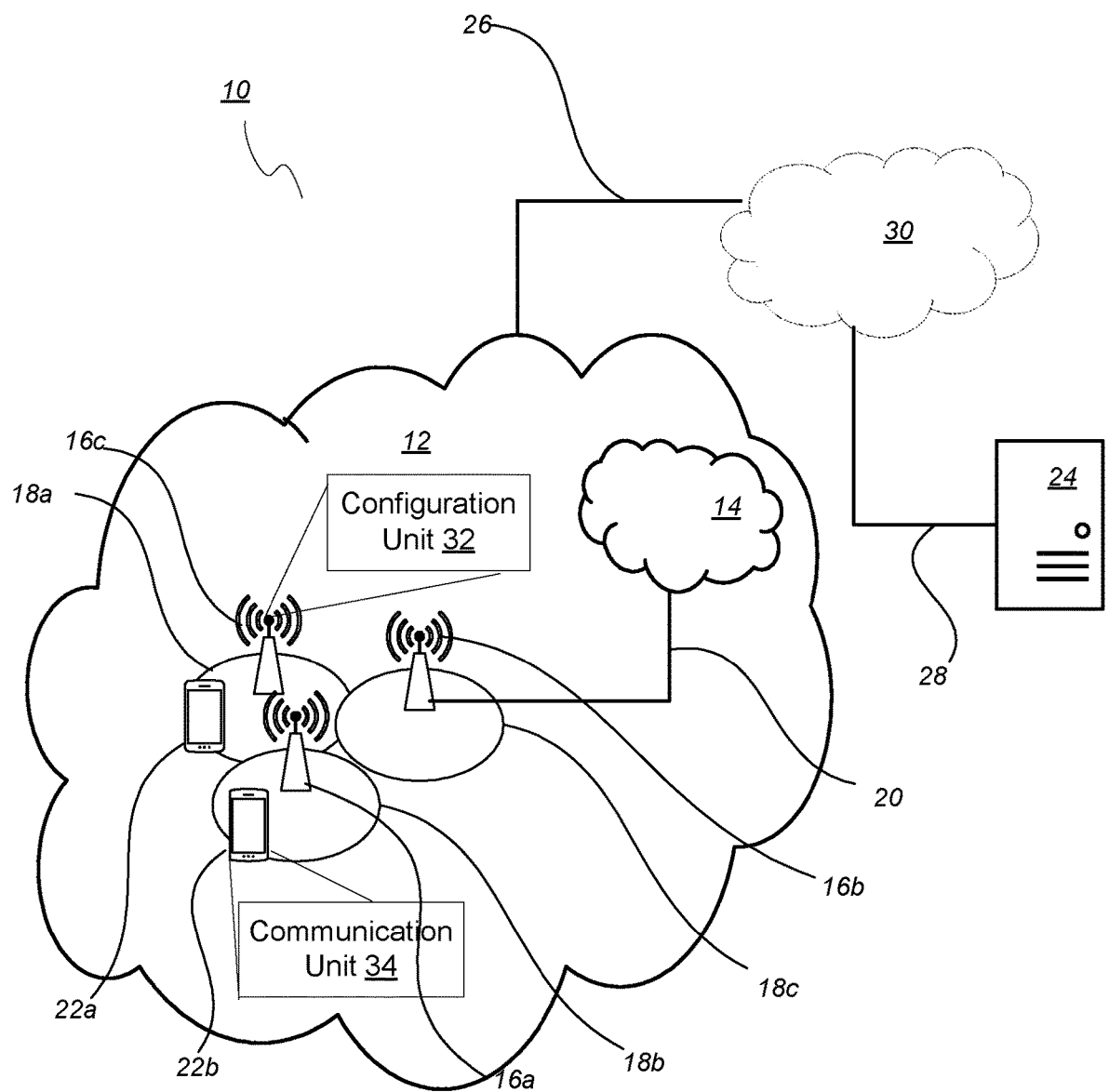
FIG. 2 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 2 a schematic diagram of a communication system, according to an embodiment, including a communication system 10, such as a 3GPP-type cellular network, which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32, which is configured to configure at least one periodic signal of the WD 22 based at least on at least one parameter, the at least one parameter corresponding to a time division duplex, TDD, pattern. In some embodiments, the configuration unit 32 is configured to configure a periodic signal of the WD 22 based at least on at least one parameter, the at least one parameter including a first parameter corresponding to a length of a TDD pattern. The TDD pattern in embodiments described herein may be of a set of TDD pattern (e.g., FIG. 1), and each of the set of TDD patterns may have a different pattern length as compared to at least one other TDD pattern of the set of TDD patterns. A wireless device 22 is configured to include a communication unit 34 which is configured to communicate at least one periodic signal to the network node 16 based at least on at least one parameter, the at least one parameter corresponding to a time division duplex, TDD, pattern. In some embodiments, the communication unit 34 is configured for communicating a periodic signal to the network node 16 based at least on at least one parameter, the at least one parameter including a first parameter corresponding to a length of a TDD pattern, which may, in some embodiments, be one TDD pattern of a set of TDD patterns having a varying length (e.g., measured in for example slots or other time-based measurement).

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to a traditional processor and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider monitor the network node 16 and/or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to a traditional processor and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, the network node 16 may include configuration unit 32 configured to configure at least one periodic signal of the WD 22 based at least on at least one parameter, the at least one parameter corresponding to a time division duplex, TDD, pattern.

In some embodiments, the at least one parameter includes a parameter corresponding to a length of the TDD pattern. In some embodiments, the network node 16, such as via the processing circuitry 68 and/or configuration unit 32, is further configured to configure the periodic signal of the WD 22 by being configured to cause the radio interface 62 to signal the at least one parameter corresponding to the TDD pattern to the WD 22. In some embodiments, the at least one periodic signal includes at least one of a Scheduling Request, a Sounding Reference Signal, an Uplink transmission without grant and a Channel State Information—Reference Signal. In some embodiments, the at least one parameter includes a parameter representing a periodicity as a multiple of a length of the TDD pattern. In some embodiments, the at least one parameter includes a parameter corresponding to an offset associated with the TDD pattern. In some embodiments, the at least one parameter includes an indication of transmission opportunities in the TDD pattern for the WD 22. In some embodiments, the indication of the transmission opportunities for the WD 22 is one of a bitmap and a variable-length vector that indicates the transmission opportunities. In some embodiments, the at least one parameter includes a first parameter representing a periodicity in terms of transmission opportunities and a second parameter representing an offset in terms of transmission opportunities. In some embodiments, the transmission opportunities are indicated using contiguous integers.

In some embodiments, processing circuitry 68 of the network node 16 may include configuration unit 32 configured to configure a periodic signal of the WD 22 based at least on at least one parameter, the at least one parameter including a first parameter corresponding to a length of a TDD pattern. In some embodiments, the configuration of the periodic signal of the WD 22 includes the processing circuitry 68 being configured to cause the radio interface 62 to signal at least the first parameter corresponding to the length of the TDD pattern to the WD 22. In some embodiments, the at least one parameter includes a second parameter representing a periodicity as a multiple of the length of the TDD pattern and a third parameter corresponding to an offset associated with the TDD pattern. In some embodiments, the at least one parameter includes a parameter representing a periodicity in terms of transmission opportunities and a parameter representing an offset in terms of transmission opportunities.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to a traditional processor and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the wireless device 22 may include a communication unit 34 configured to cause the radio interface 82 to communicate at least one periodic signal to the network node 16 based at least on at least one parameter, the at least one parameter corresponding to a time division duplex, TDD, pattern.

In some embodiments, the at least one parameter includes a parameter corresponding to a length of the TDD pattern. In some embodiments, the WD 22, such as via processing circuitry 84 and/or communication unit 34, is further configured to cause the radio interface 82 to receive signaling of the at least one parameter corresponding to the TDD pattern from the network node 16. In some embodiments, the at least one periodic signal includes at least one of a Scheduling Request, a Sounding Reference Signal, an Uplink transmission without grant and a Channel State Information—Reference Signal. In some embodiments, the at least one parameter includes a parameter representing a periodicity as a multiple of a length of the TDD pattern. In some embodiments, the at least one parameter includes a parameter corresponding to an offset associated with the TDD pattern. In some embodiments, the at least one parameter includes an indication of transmission opportunities in the TDD pattern for the WD 22. In some embodiments, the indication of the transmission opportunities for the WD 22 is one of a bitmap and a variable-length vector that indicates the transmission opportunities. In some embodiments, the at least one parameter includes a first parameter representing a periodicity in terms of transmission opportunities and a second parameter representing an offset in terms of transmission opportunities. In some embodiments, the transmission opportunities are indicated using contiguous integers.

In some embodiments, the processing circuitry 84 of the wireless device 22 may include a communication unit 34 configured to cause the radio interface 82 to communicate a periodic signal to the network node 16 based at least on at least one parameter, the at least one parameter including a first parameter corresponding to a length of a TDD pattern. In some embodiments, the processing circuitry 84 is further configured to cause the radio interface 82 to communicate the periodic signal to the network node 16 based at least on the first parameter, as a result of the radio interface 82 receiving signaling of the first parameter corresponding to the length of the TDD pattern from the network node 16. In some embodiments, the at least one parameter includes a second parameter representing a periodicity as a multiple of the length of the TDD pattern and a third parameter corresponding to an offset associated with the TDD pattern. In some embodiments, the at least one parameter includes a parameter representing a periodicity in terms of transmission opportunities and a parameter representing an offset in terms of transmission opportunities.

Figure 3:
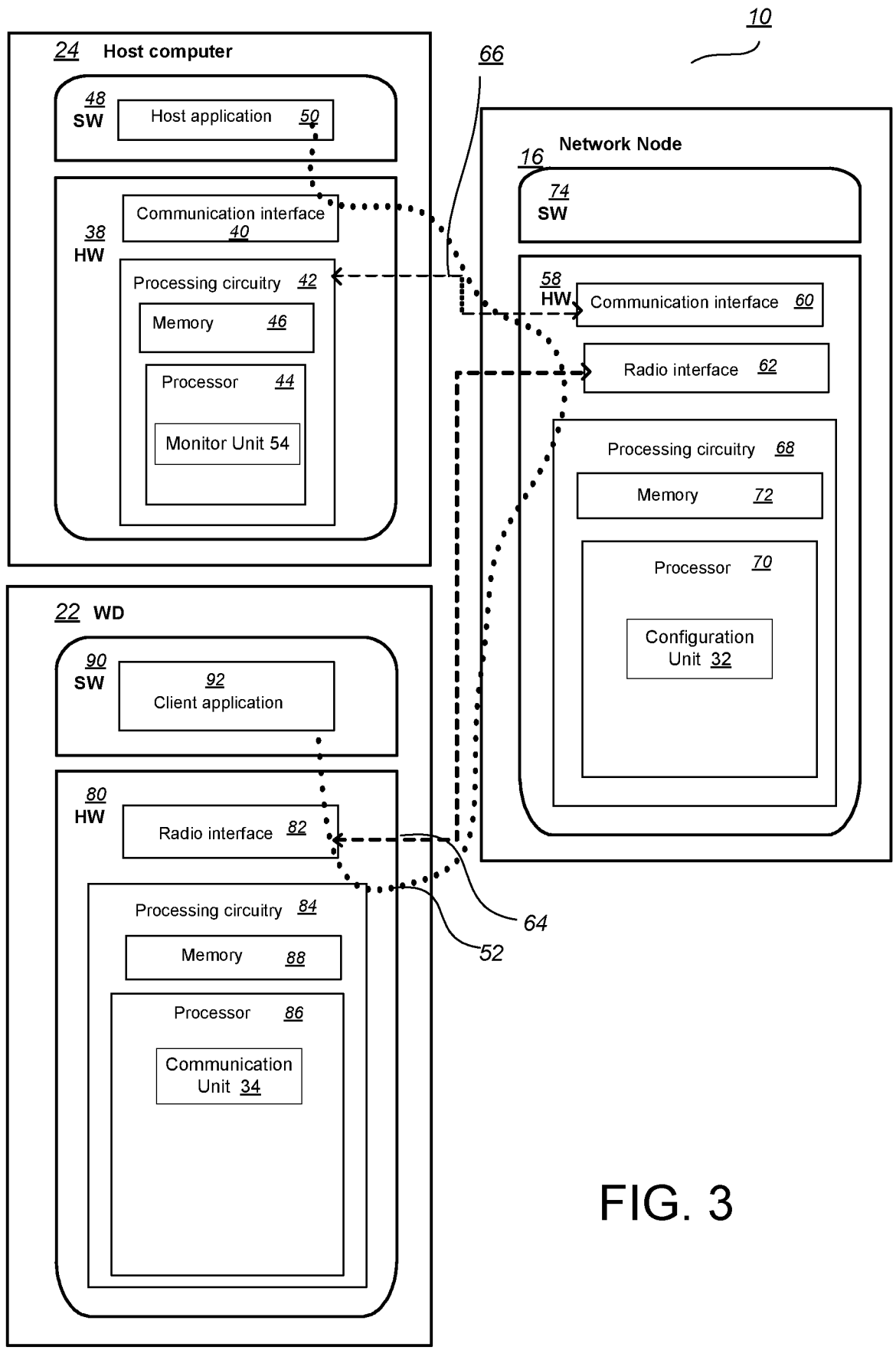
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Although FIGS. 2 and 3 show various "units" such as configuration unit 32, and communication unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
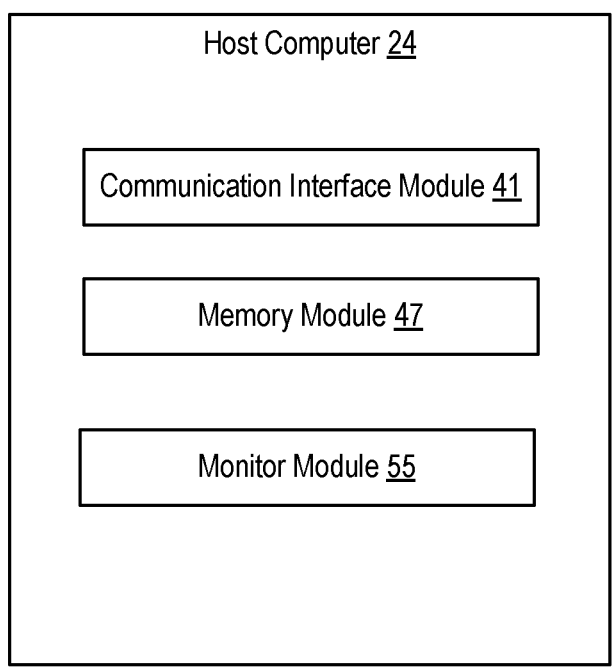
FIG. 4 is a block diagram of an alternative embodiment of a host computer according to some embodiments of the present disclosure.

FIG. 4 is a block diagram of an alternative host computer 24, which may be implemented at least in part by software modules containing software executable by a processor to perform the functions described herein. The host computer 24 include a communication interface module 41 configured to set up and maintain a wired or wireless connection with an interface of a different communication device of the communication system 10. The memory module 47 is configured to store data, programmatic software code and/or other information described herein. Monitor module 55 is configured to enable the service provider to monitor the network node 16 and or the wireless device 22.

Figure 5:
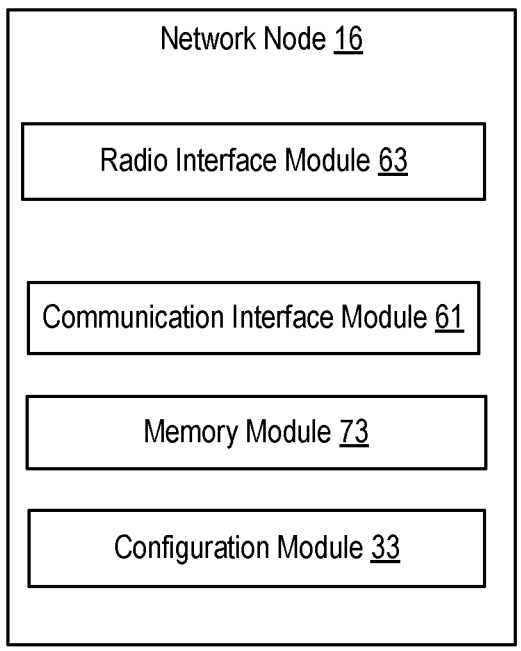
FIG. 5 is a block diagram of an alternative embodiment of a network node according to some embodiments of the present disclosure.

FIG. 5 is a block diagram of an alternative network node 16, which may be implemented at least in part by software modules containing software executable by a processor to perform the functions described herein. The network node 16 includes a radio interface module 63 configured for setting up and maintaining at least a wireless connection 64 with a WD 22 located in a coverage area 18 served by the network node 16. The network node 16 also includes a communication interface module 61 configured for setting up and maintaining a wired or wireless connection with an interface of a different communication device of the communication system 10. The communication interface module 61 may also be configured to facilitate a connection 66 to the host computer 24. The memory module 73 that is configured to store data, programmatic software code and/or other information described herein. The configuration module 33 is configured to configure a periodic signal of the WD 22 based at least on at least one parameter, the at least one parameter including a first parameter corresponding to a length of a TDD pattern.

Figure 6:
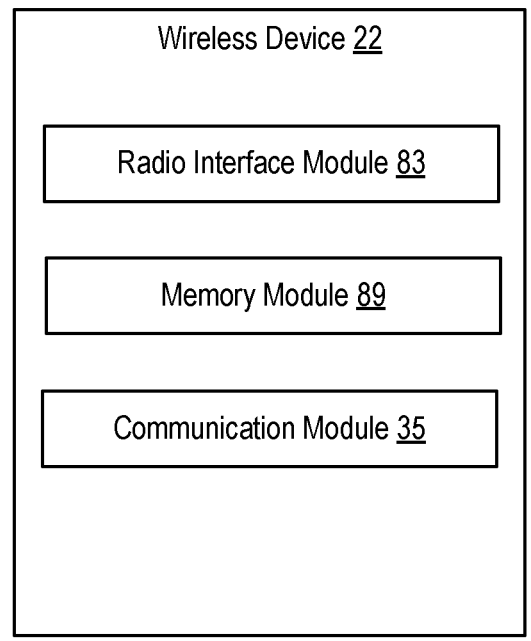
FIG. 6 is a block diagram of an alternative embodiment of a wireless device according to some embodiments of the present disclosure.

FIG. 6 is a block diagram of an alternative wireless device 22, which may be implemented at least in part by software modules containing software executable by a processor to perform the functions described herein. The WD 22 includes a radio interface module 83 configured to set up and maintain a wireless connection 64 with a network node 16 serving a coverage area 18 in which the WD 22 is currently located. The memory module 89 is configured to store data, programmatic software code and/or other information described herein. The communication module 35 is configured to communicate a periodic signal to the network node 16 based at least on at least one parameter, the at least one parameter including a first parameter corresponding to a length of a TDD pattern. In some embodiments, communication of the periodic signal to the network node 16 may also be considered to include formatting the periodic signal according to at least the at least one parameter and then transmitting such formatted periodic signal to the network node 16.

FIG. 7 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 114, associated with the host application 74 executed by the host computer 24 (block S108).

FIG. 8 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

FIG. 9 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 10 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 11:
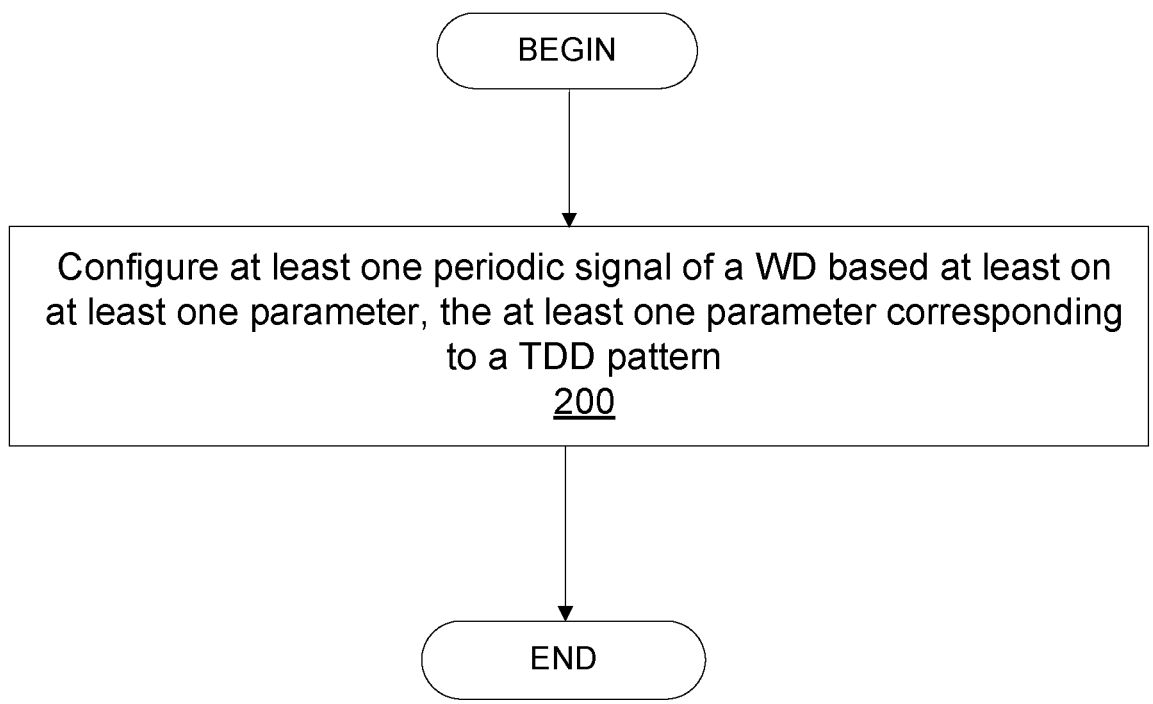
FIG. 11 is a flowchart of an exemplary process in a network node for the configuration of a periodic signal in a TDD system according to some embodiments of the present disclosure.

FIG. 11 is a flowchart of an exemplary process in a network node 16 for configuring, such as via processing circuitry 68 and/or configuration unit 32 and/or radio interface 62, at least one periodic signal associated with a WD 22 based at least on at least one parameter, the at least one parameter corresponding to a time division duplex (TDD) pattern (block S200). In some embodiments, the at least one parameter includes a parameter corresponding to a length of the TDD pattern. In some embodiments, the configuring the periodic signal of the WD 22 based at least on the at least one parameter further comprises, such as via processing circuitry 68 and/or configuration unit 32 and/or radio interface 62, signaling the at least one parameter corresponding to the TDD pattern to the WD 22. In some embodiments, the at least one periodic signal includes at least one of a Scheduling Request, a Sounding Reference Signal, an Uplink transmission without grant and a Channel State Information—Reference Signal. In some embodiments, the at least one parameter includes a parameter representing a periodicity as a multiple of a length of the TDD pattern. In some embodiments, the at least one parameter includes a parameter corresponding to an offset associated with the TDD pattern. In some embodiments, the at least one parameter includes an indication of transmission opportunities in the TDD pattern for the WD 22. In some embodiments, the indication of the transmission opportunities for the WD 22 is one of a bitmap and a variable-length vector that indicates the transmission opportunities. In some embodiments, the at least one parameter includes a first parameter representing a periodicity in terms of transmission opportunities and a second parameter representing an offset in terms of transmission opportunities. In some embodiments, the transmission opportunities are indicated using contiguous integers.

In some embodiments, the periodic signal associated with a WD 22 can be a periodic signal of the WD 22 (e.g. a transmission of the WD 22), and, in some embodiments, the periodic signal associated with the WD 22 can be a periodic signal for communication with the WD 22 (e.g., a transmission to the WD 22). In some embodiments, configuring the periodic signal of the WD 22 includes signaling at least the first parameter corresponding to the length of the TDD pattern to the WD 22. In some embodiments, the at least one parameter includes a second parameter representing a periodicity as a multiple of the length of the TDD pattern and a third parameter corresponding to an offset associated with the TDD pattern. In some embodiments, the at least one parameter includes a parameter representing a periodicity in terms of transmission opportunities and a parameter representing an offset in terms of transmission opportunities.

Figure 12:
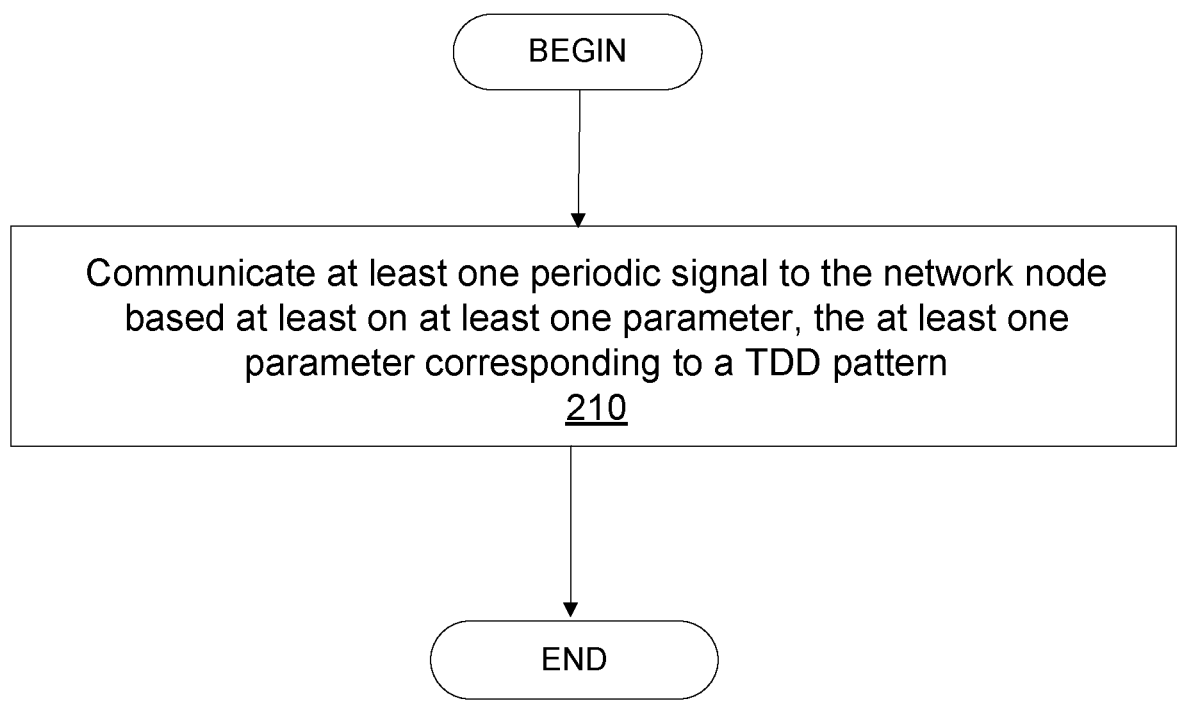
FIG. 12 is a flowchart of an exemplary process in a wireless device for the configuration of a periodic signal in a TDD system according to some embodiments of the present disclosure.

FIG. 12 is a flowchart of an exemplary process in a wireless device 22 for communicating at least one periodic signal to a network node 16 based at least on at least one parameter, the at least one parameter corresponding to a TDD pattern (block S210). In some embodiments, the at least one parameter includes a parameter corresponding to a length of the TDD pattern. In some embodiments, the method further includes receiving signaling, such as via processing circuitry 84 and/or communication unit 34 and/or radio interface 82, of the at least one parameter corresponding to the TDD pattern from the network node 16. In some embodiments, the at least one periodic signal includes at least one of a Scheduling Request, a Sounding Reference Signal, an Uplink transmission without grant and a Channel State Information—Reference Signal. In some embodiments, the at least one parameter includes a parameter representing a periodicity as a multiple of a length of the TDD pattern. In some embodiments, the at least one parameter includes a parameter corresponding to an offset associated with the TDD pattern. In some embodiments, the at least one parameter includes an indication of transmission opportunities in the TDD pattern for the WD 22. In some embodiments, the indication of the transmission opportunities for the WD 22 is one of a bitmap and a variable-length vector that indicates the transmission opportunities. In some embodiments, the at least one parameter includes a first parameter representing a periodicity in terms of transmission opportunities and a second parameter representing an offset in terms of transmission opportunities. In some embodiments, the transmission opportunities are indicated using contiguous integers.

In some embodiments, communicating the periodic signal to the network node 16 based at least on the first parameter is a result of the radio interface 82 receiving signaling of the first parameter corresponding to the length of the TDD pattern from the network node 16. In some embodiments, the at least one parameter includes a second parameter representing a periodicity as a multiple of the length of the TDD pattern and a third parameter corresponding to an offset associated with the TDD pattern. In embodiments, the WD 22 also receives signaling of the second parameter and the third parameter. In some embodiments, the at least one parameter includes a parameter representing a periodicity in terms of transmission opportunities and a parameter representing an offset in terms of transmission opportunities.

Embodiments provide for the use of the TDD pattern length as a factor in the configuration of the periodic signal or periodic allocation. For clarity, the term "periodic signal" will be used in the following description. In some embodiments, the periodic signal may be considered to be a signal that has a predetermined length and repeats according to a predetermined pattern. Also, the length of the TDD pattern may be denoted as L (slots). The TDD pattern may be considered to repeat after L slots, i.e., two slots n and m have the same UL/DL structure if n mod L=m mod L, where mod is the modulo operator. Also, the term "length" in some embodiments is intended to indicate a measurement or other indication of a period of time (e.g., time slots, ms, etc.).

In some embodiments, configuration/configuring of the periodic signal is intended generally to mean to arrange or order the periodic signal associated with the WD according to one or more parameters (e.g., length of the TDD pattern used to transmit the periodic signal). The term "configuration of the periodic signal" is intended broadly in some embodiments to encompass signaling of the parameter(s) from one node (e.g., network node 16 or another intermediate node) to another node (e.g., WD 22), as well as, deriving the parameter(s) from other information, which may be signaled from one node (e.g., network node 16 or another intermediate node) to another node (e.g., WD 22), or which may already be known or otherwise derived by the node (e.g., WD 22 or network node 16) from known information without signaling.

In a first embodiment, the configuration of a periodic signal may be based at least on the TDD pattern length L and a parameter X describing the periodicity as a multiple of the TDD pattern length. In further embodiments, the configuration of the periodic signal may be further based on an offset parameter Y that describes the offset within the TDD pattern. In some embodiments, the periodic signal would then occur in slots n where (n−Y) mod XL=0. In this case, relevant parameter ranges may be Y=0, . . . , L−1 or Y=0, . . . , XL−1 depending on the level of control that is wanted for the configuration.

If multiple transmission opportunities exist within a slot, a symbol offset within the slot (start position) may also be provided. One example is an SR that uses Physical Uplink Control Channel (PUCCH)—the symbol offset within a slot (start position) can be derived from the PUCCH configuration.

In a second embodiment, the configuration of a periodic signal may be based on the TDD pattern length L and a parameter X describing the periodicity as a multiple of the TDD pattern length, and an offset parameter Y that describes the offset within the TDD pattern, and an offset parameter Z that describes the offset in terms of multiples of the TDD pattern length. In embodiments, the periodic signal would then occur in slots n where (n−ZL−Y) mod XL=0. In this case, relevant parameter ranges may be Y=0, . . . , L−1 and Z=0, . . . , X−1.

In a third embodiment, the configuration of a periodic signal is based on the TDD pattern length L and a parameter X describing the periodicity as a multiple of the TDD pattern length, and an offset parameter Z that describes the offset in terms of multiples of the TDD pattern length. In some embodiments, within a TDD pattern, the opportunities are either indicated by a bitmap (preferred length #UL opportunities), or a variable-length vector (up to #UL opportunities) that specifies the used UL opportunities. In some embodiments, for periodic DL signals, the bitmap/vector length would follow the number of DL opportunities. This embodiment may be considered particularly useful if multiple transmission opportunities exist with a TDD pattern.

In embodiments, configuration of the periodic signal would then rely on signaling values for parameters L, X, Y, Z (or relevant subset thereof) to the UE. Signaling is typically made using the Radio Resource Control (RRC) in L3. In the embodiments described above, the offset within a TDD pattern may not take all values Y=0, . . . , L−1, since out of the L slots within a TDD pattern not all slots contain transmission opportunities for the signal of interest (e.g., only slots that contain UL opportunities are relevant for SR and SRS, and for CSI-RS only slots with DL opportunities are relevant). In embodiments, the signaling can therefore be reduced to $L_x$ values (corresponding to the slots with DL or UL opportunities) and $L_x$ different values are mapped to the $L_x$ slots with (UL or DL) opportunities within a TDD pattern.

In embodiments, the value of the parameter Y, or more generally, the offset, can be implicit, based on the location of the transmission opportunity if only one opportunity exists within the TDD period, e.g., an UL transmission when there is only one slot in the TDD pattern allowing UL transmission (e.g., Pattern A in FIG. 1). In some embodiments, the implicit determination of Y, or other offset, may also consider the transmission length of the UL signal that the resource is configured for.

In some embodiments, the value of the parameter L can in some cases be derived from other parameters that describe the TDD pattern, and, in that case, explicitly signaling parameter L in conjunction with configuration of the periodic signal may not be required. In other words, in some embodiments, the value of parameter L may be determined using other parameters that describe the TDD pattern; thus, the value of parameter L may itself not be explicitly signaled in some embodiments.

When FDD is used, this can be interpreted as a TDD pattern with length L=1, where each slot has both UL and DL transmission opportunities.

In a fourth embodiment, the UE numbers the transmission opportunities using contiguous integers, and then the transmission opportunities included in the periodic signal pattern are the transmission opportunity m where (m−A) mod B=0, where B is the periodicity in terms of transmission opportunities and A is an offset in terms of transmission opportunities.

An example of this scheme can be made using Pattern D in FIG. 1. In the example, assume that the periodic signal we want to configure is an UL signal, and that the second and the fifth slot of the pattern contains UL transmission opportunities. We can then number the transmission opportunities (TOs) as follows:

TO #0: Slot #1
TO #1: Slot #4
TO #2: Slot #6
TO #3: Slot #9
. . .
TO #k: Slot #(1+5*k/2) k even
TO #k+1: Slot #(4+5*k/2)

By specifying the signal periodicity using, for example, B=3, A=1, we can then derive the periodic signal as occupying TOs 1, 4, 7, 10, . . . which corresponds to slots #4, 11, 19, 26, . . . .

In embodiments, the configuration of the periodic signal would then rely on signaling values for parameters A and B to the UE. Signaling is typically made using RRC in L3.

The third embodiment may be considered particularly well suited for the case where there are multiple transmission opportunities within a slot, e.g., if an SR periodicity of 2 or 7 symbols is to be configured.

For the first and second embodiments, L specifies the number of slots within a TDD pattern. Also, the related offset values are expressed in slots (or Z in TDD pattern periods). Equivalent symbols could be used in other embodiments.

An alternative may be to use absolute time, e.g., ms or μs of the TDD pattern periodicity, and express the TDD pattern length and offset values in multiples of the TDD pattern periodicity. In yet other embodiments, yet other units of measurement may be used to express the periodicity in accordance with embodiments of the present disclosure.

NR supports multiple numerologies (e.g., orthogonal frequency-division multiplexing (OFDM) subcarrier spacing, OFDM symbol length, cyclic prefix (CP), slot length, etc.) which are related to each other via scaling from each other. If the defined TDD pattern (expressed in absolute time for example) also scale with numerology, the specification could define periodicity and offset values for a reference numerology and actual periodicity and offset would be derived via scaling. For example, for a second numerology with twice the subcarrier spacing of a first (reference) numerology, the offset and periodicity would be half as long as in the first numerology.

NR currently defines a set of periodicity values, as described herein above with reference to the tables in the introduction section at the beginning of this document. Depending on if a UE has a TDD pattern configured, in some embodiments, the UE could use one of the embodiments outlined herein while in absence of a configured TDD pattern that is currently specified in NR. In other words, in some embodiments, depending on presence/absence of TDD pattern configuration, a UE may use two different methods to determine periodicity and offset value of a periodic signal (e.g., UE may read two different tables depending on the presence or absence of a TDD pattern configuration, or may use the same/one table but interpret the table differently depending on the presence or absence of a TDD pattern configuration).

Some additional embodiments may include one or more of the following:

Embodiment A1. A network node configured to communicate with a wireless device (WD), the network configured to, and/or comprising a radio interface and/or comprising processing circuitry configured to configure a periodic signal of the WD based at least on at least one parameter, the at least one parameter including a first parameter corresponding to a length of a time division duplex (TDD) pattern.

Embodiment A2. The network node of Embodiment A1, wherein the configuration of the periodic signal of the WD includes the processing circuitry being configured to cause the radio interface to signal at least the first parameter corresponding to the length of the TDD pattern to the WD.

Embodiment A3. The network node of any of Embodiments A1 and A2, wherein the at least one parameter includes a second parameter representing a periodicity as a multiple of the length of the TDD pattern and a third parameter corresponding to an offset associated with the TDD pattern.

Embodiment A4. The network node of any of Embodiments A1 and A2, wherein the at least one parameter includes a parameter representing a periodicity in terms of transmission opportunities and a parameter representing an offset in terms of transmission opportunities.

Embodiment B1. A communication system including a host computer, the host computer comprising:
  processing circuitry configured to provide user data; and
  a communication interface configured to forward the user data to a cellular network for transmission to a wireless device (WD),
  the cellular network comprising a network node having a radio interface and processing circuitry, the network node configured to, and/or the network node's processing circuitry configured to configure a periodic signal of the WD based at least on at least one parameter, the at least one parameter including a first parameter corresponding to a length of a time division duplex (TDD) pattern.

Embodiment B2. The communication system of Embodiment B1, further including the network node.

Embodiment B3. The communication system of Embodiment B2, further including the WD, wherein the WD is configured to communicate with the network node.

Embodiment B4. The communication system of Embodiment B3, wherein:
  the processing circuitry of the host computer is configured to execute a host application, thereby providing the user data; and the WD comprises processing circuitry configured to execute a client application associated with the host application.

Embodiment C1. A method implemented in a network node, the method comprising configuring a periodic signal associated with a wireless device (WD) based at least on at least one parameter, the at least one parameter including a first parameter corresponding to a length of a time division duplex (TDD) pattern.

Embodiment C2. The method of Embodiment C1, wherein configuring the periodic signal of the WD includes signaling at least the first parameter corresponding to the length of the TDD pattern to the WD.

Embodiment C3. The method of any of Embodiments C1 and C2, wherein the at least one parameter includes a second parameter representing a periodicity as a multiple of the length of the TDD pattern and a third parameter corresponding to an offset associated with the TDD pattern.

Embodiment C4. The method of any of Embodiments C1 and C2, wherein the at least one parameter includes a parameter representing a periodicity in terms of transmission opportunities and a parameter representing an offset in terms of transmission opportunities.

Embodiment D1. A method implemented in a communication system including a host computer, a network node and a wireless device (WD), the method comprising:
  at the host computer, providing user data; and
  at the host computer, initiating a transmission carrying the user data to the WD via a cellular network comprising the network node, wherein the network node is configured to configure a periodic signal of the WD based at least on at least one parameter, the at least one parameter including a first parameter corresponding to a length of a time division duplex (TDD) pattern.

Embodiment D2. The method of Embodiment D1, further comprising, at the network node, transmitting the user data.

Embodiment D3. The method of Embodiment D2, wherein the user data is provided at the host computer by executing a host application, the method further comprising, at the WD, executing a client application associated with the host application.

Embodiment E1. A wireless device (WD) configured to communicate with a network node, the WD configured to, and/or comprising a radio interface and/or processing circuitry configured to cause the radio interface to communicate a periodic signal to the network node based at least on at least one parameter, the at least one parameter including a first parameter corresponding to a length of a time division duplex (TDD) pattern.

Embodiment E2. The WD of Embodiment E1, wherein the processing circuitry is further configured to cause the radio interface to communicate the periodic signal to the network node based at least on the first parameter, as a result of the radio interface receiving signaling of the first parameter corresponding to the length of the TDD pattern from the network node.

Embodiment E3. The WD of any of Embodiments E1 and E2, wherein the at least one parameter includes a second parameter representing a periodicity as a multiple of the length of the TDD pattern and a third parameter corresponding to an offset associated with the TDD pattern.

Embodiment E4. The WD of any of Embodiments E1 and E2, wherein the at least one parameter includes a parameter representing a periodicity in terms of transmission opportunities and a parameter representing an offset in terms of transmission opportunities.

Embodiment F1. A communication system including a host computer, the host computer comprising:
  processing circuitry configured to provide user data; and
  a communication interface configured to forward user data to a cellular network for transmission to a wireless device (WD),
  the WD configured to, and/or comprising a radio interface and/or processing circuitry configured to cause the radio interface to communicate a periodic signal to the network node based at least on at least one parameter, the at least one parameter including a first parameter corresponding to a length of a time division duplex (TDD) pattern.

Embodiment F2. The communication system of Embodiment F1, further including the WD.

Embodiment F3. The communication system of Embodiment F2, wherein the cellular network further includes a network node configured to communicate with the WD.

Embodiment F4. The communication system of Embodiment F2 or F3, wherein:
  the processing circuitry of the host computer is configured to execute a host application, thereby providing the user data; and
  the WD's processing circuitry is configured to execute a client application associated with the host application.

Embodiment G1. A method implemented in a wireless device (WD), the method comprising communicating a periodic signal to the network node based at least on at least one parameter, the at least one parameter including a first parameter corresponding to a length of a time division duplex (TDD) pattern.

Embodiment G2. The method of Embodiment G1, wherein communicating the periodic signal to the network node based at least on the first parameter is a result of the radio interface receiving signaling of the first parameter corresponding to the length of the TDD pattern from the network node.

Embodiment G3. The method of any of Embodiments G1 and G2, wherein the at least one parameter includes a second parameter representing a periodicity as a multiple of the length of the TDD pattern and a third parameter corresponding to an offset associated with the TDD pattern.

Embodiment G4. The method of any of Embodiments G1 and G2, wherein the at least one parameter includes a parameter representing a periodicity in terms of transmission opportunities and a parameter representing an offset in terms of transmission opportunities.

Embodiment H1. A method implemented in a communication system including a host computer, a network node and a wireless device (WD), the method comprising:
  at the host computer, providing user data; and
  at the host computer, initiating a transmission carrying the user data to the WD via a cellular network comprising the network node, wherein the WD is configured to, and/or comprises a radio interface and processing circuitry configured to cause the radio interface to communicate a periodic signal to the network node based at least on at least one parameter, the at least one parameter including a first parameter corresponding to a length of a time division duplex (TDD) pattern.

Embodiment H2. The method of Embodiment 35, further comprising, at the WD, receiving the user data from the network node.

Embodiment I1. A network node, comprising:
  a memory module configured to store at least one parameter; and a configuration module configured to configure a periodic signal of the WD based at least on the at least one parameter, the at least one parameter including a first parameter corresponding to a length of a time division duplex (TDD) pattern.

Embodiment I2. A wireless device, comprising:
a memory module configured to store at least one parameter; and
a configuration module configured to communicate a periodic signal to a network node based at least on the at least one parameter, the at least one parameter including a first parameter corresponding to a length of a time division duplex (TDD) pattern.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviations | Explanation |
| --- | --- |
| CSI-RS | Channel State Information Reference Signal |
| PDCCH | Physical Downlink Control Channel |
| PDSCH | Physical Downlink Shared Channel |
| PUSCH | Physical Uplink Shared Channel |
| SR | Scheduling Request |
| SRS | Sounding Reference Signal |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings, without departing from the scope of the following claims.

What is claimed is:
1. A network node configured to communicate with a wireless device, WD, the network node configured to configure at least one periodic signal transmitted or received by the WD based at least on at least one parameter, the at least one parameter corresponding to a time division duplex, TDD, pattern,
wherein the at least one parameter includes a parameter representing a periodicity as a multiple of a length of the TDD pattern.

2. The network node of claim 1, wherein the at least one parameter includes a parameter corresponding to a length of the TDD pattern.

3. The network node of claim 1, wherein the network node is further configured to configure the periodic signal of the WD by being configured to:
cause the radio interface to signal the at least one parameter corresponding to the TDD pattern to the WD.

4. The network node of claim 1, wherein the at least one periodic signal includes at least one of a Scheduling Request (SR) signal, a Sounding Reference (SRS) Signal, an Uplink transmission without grant signal and a Channel State Information Reference Signal (CSI-RS).

5. The network node of claim 1, wherein the at least one parameter includes a parameter corresponding to an offset associated with the TDD pattern.

6. The network node of claim 1, wherein the at least one parameter includes an indication of transmission opportunities in the TDD pattern for the WD, wherein the indication of the transmission opportunities for the WD is one of a bitmap and a variable-length vector that indicates the transmission opportunities.

7. The network node of claim 1, wherein the at least one parameter includes a first parameter representing a periodicity in terms of transmission opportunities and a second parameter representing an offset in terms of transmission opportunities.

8. The network node of claim 7, wherein the transmission opportunities are indicated using contiguous integers.

9. A method for a network node configured to communicate with a wireless device, WD, the method comprising:
configuring at least one periodic signal of the WD based at least on at least one parameter, the at least one parameter corresponding to a time division duplex, TDD, pattern, wherein the at least one parameter includes a parameter representing a periodicity as a multiple of a length of the TDD pattern.

10. The method of claim 9, wherein the configuring the periodic signal of the WD based at least on the at least one parameter further comprises:
signaling the at least one parameter corresponding to the TDD pattern to the WD,
wherein the at least one parameter includes:
a parameter corresponding to a length of the TDD pattern,
a parameter representing a periodicity as a multiple of a length of the TDD pattern,
a parameter corresponding to an offset associated with the TDD pattern,
wherein the at least one parameter includes an indication of transmission opportunities in the TDD pattern for the WD, wherein the indication of the transmission opportunities for the WD is one of a bitmap and a variable-length vector that indicates the transmission opportunities,
wherein the at least one parameter includes a first parameter representing a periodicity in terms of transmission opportunities and a second parameter representing an offset in terms of transmission opportunities, wherein the transmission opportunities are indicated using contiguous integers.

11. A wireless device, WD, configured to communicate with a network node, the WD configured to cause a radio interface to communicate with the network node using at least one periodic signal based at least on at least one parameter, the at least one parameter corresponding to a time division duplex, TDD, pattern, wherein the at least one parameter includes a parameter representing a periodicity as a multiple of a length of the TDD pattern.

12. The WD of claim 11, wherein the at least one parameter includes a parameter corresponding to a length of the TDD pattern.

13. The WD of claim 11, further configured to cause the radio interface to receive signaling of the at least one parameter corresponding to the TDD pattern from the network node.

14. The WD of claim 11, wherein the at least one periodic signal includes at least one of a Scheduling Request, a Sounding Reference Signal, an Uplink transmission without grant and a Channel State Information Reference Signal.

15. The WD of claim 11, wherein the at least one parameter includes a parameter corresponding to an offset associated with the TDD pattern.

16. The WD of claim 11, wherein the at least one parameter includes an indication of transmission opportunities in the TDD pattern for the WD, wherein the indication of the transmission opportunities for the WD is one of a bitmap and a variable-length vector that indicates the transmission opportunities.

17. The WD of claim 11, wherein the at least one parameter includes a first parameter representing a periodicity in terms of transmission opportunities and a second parameter representing an offset in terms of transmission opportunities, wherein the transmission opportunities are indicated using contiguous integers.

* * * * *